United States Patent

[11] 3,573,443

[72] Inventor Harry Fein
832 Quarter Mile Road, Orange, Conn. 06477

[21] Appl. No. 743,491
[22] Filed July 9, 1968
[45] Patented Apr. 6, 1971

[54] DIGITAL-ANALOG RECIPROCAL FUNCTION COMPUTER-GENERATOR
7 Claims, 5 Drawing Figs.

[52] U.S. Cl. .......... 235/150.53, 235/197, 340/347
[51] Int. Cl. .......... G06g 7/16, G06j 1/00
[50] Field of Search .......... 235/197, 150.5, 150.51, 150.52, 150.53; 328/142; 340/347 (O) (A)

[56] References Cited

UNITED STATES PATENTS

| | | | |
|---|---|---|---|
| 3,080,555 | 3/1963 | Vadus et al. | 235/150.53X |
| 3,264,457 | 8/1966 | Seegmiller et al. | 235/197X |
| 3,345,505 | 10/1967 | Schmid | 235/197 |
| 3,435,196 | 3/1969 | Schmid | 235/150.53X |
| 3,462,588 | 8/1969 | Hussey | 235/150.53 |
| 3,471,779 | 10/1969 | Ley | 235/150.53X |

*Primary Examiner*—Malcolm A. Morrison
*Assistant Examiner*—Joseph F. Ruggiero
*Attorney*—Fishman and Van Kirk

ABSTRACT: A hybrid circuit which may function as a digital to analog converter is disclosed. The invention comprises a combination of digital and analog circuit components which provide an analog output which is the reciprocal of a binary input signal. The invention may also be employed as a hyperbolic function generator by delivering digital input signals in consecutive order to the circuit.

H. Fein
INVENTOR.

H. Fein
INVENTOR.

Patented April 6, 1971 3,573,443

3 Sheets-Sheet 3

H. Fein
INVENTOR.

DIGITAL-ANALOG RECIPROCAL FUNCTION COMPUTER-GENERATOR

This invention relates to means whereby both digital and analog techniques are used in conjunction to compute the reciprocal of a given digital number so that the result is in analog form. Since the path or trajectory that a reciprocal will describe if the digital numbers are consecutive, that is, counting, is a hyperbola, this invention also inherently relates to a means which will generate the hyperbola function.

A brief review of the basic elements of digital-analog (D–A) conversion will best preface an introduction of the novel aspects of this invention. The literature is profuse in describing the very well known digital-analog conversion process. Some references are cited here:

1. Electronic Analog and Hybrid Computers, Korn and Korn, McGraw-Hill Co. 1964.
2. Notes on Analog-Digital Conversion Techniques, 2nd ed., Susskind, John Wiley and Sons, 1960.
3. Synthesis of Resistive Digital to Analog Conversion Ladders for Arbitrary Codes with Fixed Positive Weights, M. R. Aaron and S. K. Mitra IEEE Trans. on Electronic Computers, Vol. EC–16 No. 3 pp. 277—281 June 1967.
4. Function Generator, Schmid, U.S. Pat. No. 3,345,505.
5. Hybrid Digital-Analog Function Generator, Seegmiller et al., U.S. Pat. No. 3,264,457.

In short, a digital-analog converter is a device in which a network of resistors whose values are weighted so as to be compatible with some digital code such as binary, binary-coded decimal and so forth are connected so that when the appropriate digital numbers are selected, switches are activated which connect the selected resistors with a reference potential so that currents flow through these resistors which are proportional to the values of the digital numbers. These currents are then summed and usually converted into a potential whose magnitude is a direct measure of the whole digital number. Thus the basic elements of digital to analog conversion involves, (a) the conversion of a digital number to currents whose magnitudes are proportional to the digital number and (b) the summing of the currents. This process can be expressed mathematically as:

$$I = E_{\mathrm{ref}} \sum^{n} G_n \qquad \text{Equation 1}$$

where $E_{ref}$ is a constant reference potential and summation of $G_n$ implies the summation of those conductances selected by the digital code. For example, if in a four binary digit (bit) code, the number 5 were selected, equation 1 would take the form: $I=E_{ref}\,(G_8x0+G_4x1+G_2x0+{}_1x1)$.

A continuous function can be generated by allowing the digital numbers activating the aforementioned resistive summing networks to assume sequential values or in other words, to count in a simple manner, that is, 1, 2, 3, 4 and so forth. The result is the digital approximation of a straight line or a so-called ramp function. And if used as such we could call the digital to analog converter a linear function generator.

It is at this juncture that the novel innovation of this invention can be disclosed by comparison with the operation of the conventional D–A system just described. If, instead of making the current the dependent variable as in Equation 1, we make $E$, the voltage, the dependent variable as follows:

$$E = \frac{I_{\mathrm{ref}}}{\sum^{n} G_n} \qquad \text{Equation 2}$$

the potential is now equal to the reciprocal of the sum of the conductances. Thus, the potential $E$ is a reciprocal measure of any digital number applied to a network of conductances (resistors) provided the circuit is structured appropriately and a constant current $I_{ref}$ is generated.

Now if the digital numbers are allowed to follow a simple counting sequence 1, 2, 3, 4 etc., the resulting potential change with count will describe the digital approximation to a hyperbola. Thus in this mode of operation the reciprocal function generator can generate a hyperbolic function.

The hyperbola and other nonlinear functions can be and are generated electrically by (a) piecewise linear approximation or (b) use of devices whose physical operating characteristics lend themselves to their use as a nonlinear function generator and (c) by programming and use of digital computers.

The present invention is one of a class of hybrids, that is, means which use combinations of techniques, in this case both digital and analog. The advantages of the hybrid approach is that we achieve the accuracy inherent in digital techniques and the speed of the analog method. There are many other advantages of this apparatus. In processes where the reciprocal function is best visualized on an oscilloscope or pen recorder as a magnitude which can be visually monitored and recorded. Hyperbolic functions can be used in model synthesis to solve engineering problems.

This invention has as its object the generation of reciprocal values of digital numbers which may be read into the apparatus at almost any speed and be directly and quickly available as voltages.

This invention also has as its object the generation of a nonlinear function, the hyperbola, in a direct fashion from a digital counter directly to an analog function with high inherent accuracy.

A fuller understanding of this invention and its features and advantages may be gained by considering the following description in conjunction with the accompanying drawings, in which.

Figure 1:
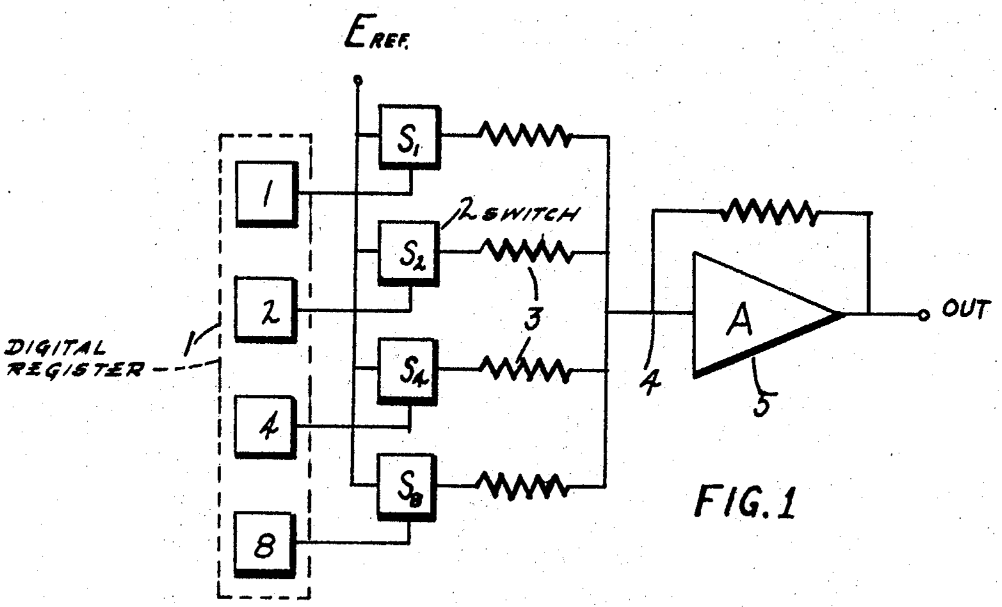
FIG. 1 is a simple example of a conventional four binary digit D–A converter.

Referring now to the drawings; FIG. 1 demonstrates graphically in a simplified drawing a conventional apparatus and method for digital to analog conversion. What is shown is a 4 bit D–A converter in which binary numbers in the digital register 1 operate their appropriate switches 2 and allow currents to flow through weighted resistors 3 into a summing junction 4 and the output voltage of the operational amplifier 5 is therefore a direct measure of the total current flowing into the junction. Digital register 1 is a 4 bit (binary digit) register-counter which may count serially or store parallel digital numbers. The subsystems indicated within register-counter 1 represent bistable circuits which comprise the binary flip-flops defining the counter. Register-counters of this type are well known in the art and an example of such a counter is shown in "Pulse, Digital and Switching Waveforms" by Millman and Taub, pp. 668—669, McGraw-Hill Pub. Co. 1965. As is well known, register-counters of the type described are capable of accepting inputs either serially or in parallel form. The switches 2 may comprise merely electromechanical relays (for slow speed applications) or modern saturating transistor switches as described in the reference cited above. In practice it should be understood that many more counting stages may be used and other resistive networks such as ladder networks are also used and that many other digital codes are possible. FIG. 1 is presented primarily to develop a contrast leading to the presentation of FIG. 2.

Figure 2:
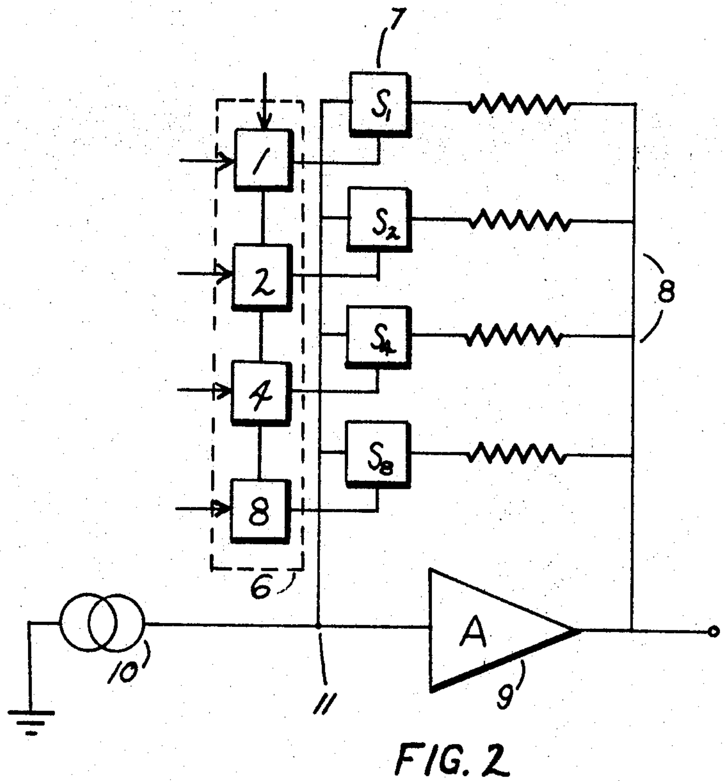
FIG. 2 is the simple example of a 4 binary digit reciprocal function generator.

In FIG. 2 one should observe that the register-counter 6, switches 7 and weighted conductances 8 (resistors) now appear in a different geometrical relationship to the operational amplifier 9. A constant current 10 is injected into the summing node 11 of the operational amplifier and the output voltage of the amplifier is now a function of the total conductance as determined by which of the switches have been closed by their respective counting stage. The digital number can be entered into the binary register in parallel or serially. Thus in FIG. 2 a simple and practical embodiment of Equation 2 is portrayed.

Figure 3:
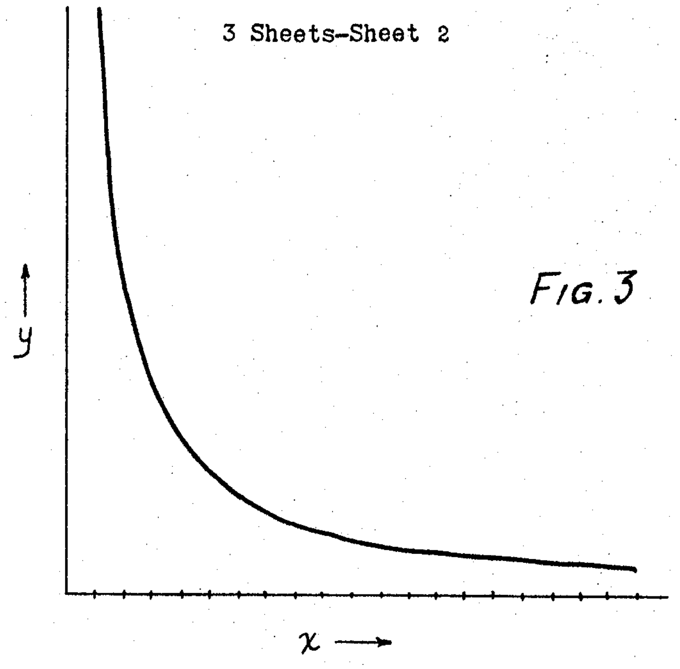
FIG. 3 is the plot of a rectangular hyperbola.
Figure 4:
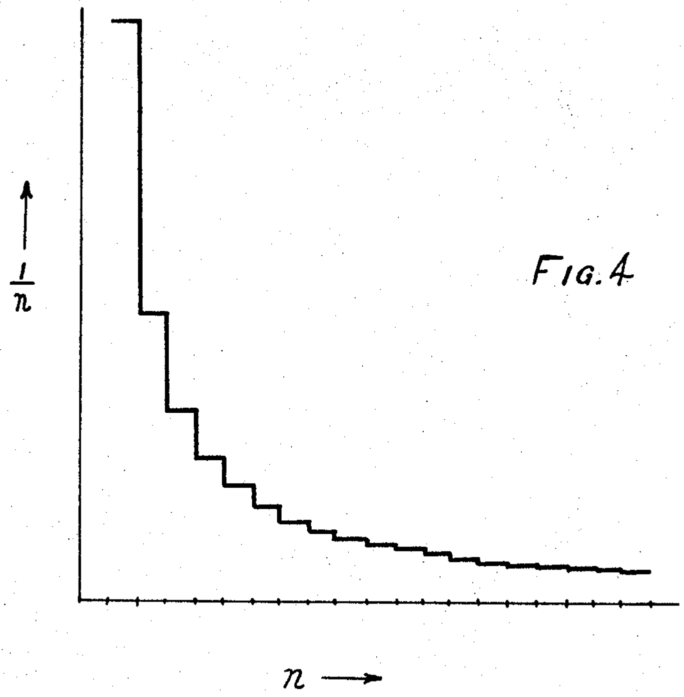
FIG. 4 is the digital approximation to the hyperbola of FIG. 3.
Figure 5:
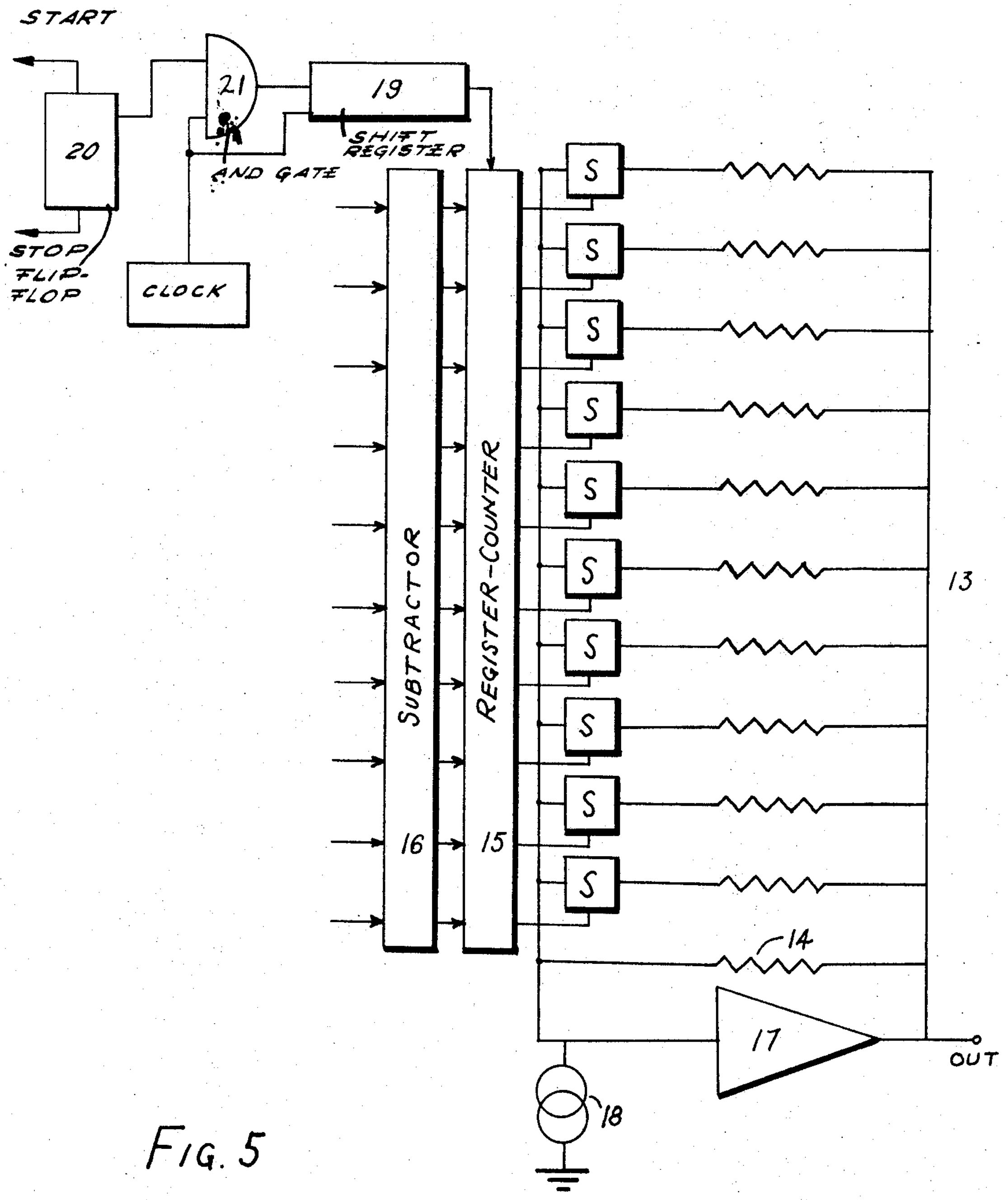
FIG. 5 is a 10 binary digit reciprocal and hyperbola generator.

It is well to digress at this juncture to discuss a few basic aspects of the reciprocal function and the hyperbola. Given the equation:

$$y=1/x \qquad \text{Equation 3}$$

and given any chosen value of $x$, $y$ is said to be the reciprocal of $x$. This function is shown in FIG. 3 and we should note that the curve is asymptotic to the $x=0$, $y=0$ coordinate axes and is in fact a rectangular hyperbola. Obviously there is no difference in principle between the reciprocal and the hyperbola. The hyperbola is simply the trajectory or locus of all points on the $x$ axis whose reciprocals are to be found on the $y$ axis by picking the vertical value on the curve corresponding to any arbitrary value of $x$. It should be evident that any artificially generated function can be only generated over a finite amplitude range. Further, any function whose argument is a series of digital numbers cannot be, strictly speaking, a smooth curve. FIG. 4 demonstrates the D-A approximation to the reciprocal function or hyperbola. One should note that the vertical steps are very coarse for small numbers and become less coarse as the number $n$ increases. Because of this, we modify equation 2 as follows:

$$E=\frac{I_{\text{ref}}}{G_{n_i}+\sum_{n=n_i}^{n} G_n} \qquad \text{Equation 4}$$

where $G_n$ is a fixed conductance. Equation 4 states that $E$ is evaluated only for values of $n$ greater than $n_i$. The practical effect of this is that we shunt the switches and resistors of the digitally weighted network 13 with a conductance $G_{n_i}$ 14 as shown in FIG. 5. This means that any digital number selected for computation of its reciprocal must: (a) be greater than $n_i$ and (b) have $n_i$ subtracted from the number and the resulting difference applied to the switching register 15. If $n_i$ is chosen large enough, the result is that the analog steps can be made arbitrarily small and a relatively smooth reciprocal function or hyperbola will ensue.

In FIG. 5 a 10 binary digit reciprocal and hyperbolic generator is shown. It is a device which may be used in two ways: (a) as a reciprocal function computer and (b) as a continuous hyperbola function generator.

RECIPROCAL FUNCTION COMPUTER

As a reciprocal function computer, binary digital numbers are applied in parallel to a subtractor 16. The function of this subtractor is to deduct a fixed number $n_i$, as previously indicated, from the applied number. The subtractor 16 may comprise a chain of effector elements arrayed in the order of their numerical significance which includes a plurality of individual binary digit subtractors. Subtraction circuits of this type are well known in the art and an illustrative example is shown in "Analog and Digital Computer Technology" by Norman R. Scott, pp. 336, McGraw-Hill Pub. Co. 1960. In FIG. 5, the applied 10-bit number, in parallel binary form as a series of zeroes and ones, is applied as the minuend to the terminals indicated at the left side of subtractor 16. The binary number which is to serve as the subtrahend is applied at a similar set of terminals each of which is paired with its appropriate digit of the minuend. The difference emerges in parallel form from the subtractor and enters the switching register-counter 15. Register-counter 15 may be a 10-bit version of register-counters 1 and 6 of FIGS. 1 and 2 respectively. This register is composed of storage elements which may be binary flip-flops each of which actuates its own switch in the switch-resistor network 13. If a binary 1 occupies any given element of the register, the switch controlled by that element closes and allows a selected resistor to be an operative shunting element in the resistor network. It should be noted that the conductance $G_{n_i}$ is connected across the network at all times and does not have a corresponding switch. $G_{n_i}$ represents that conductance corresponding to the number $n_i$ which was subtracted from the applied number at the input of the subtractor. It therefore represents a lower limit of numbers whose reciprocal is to be computed. Finally, the entire switch and resistor network can be seen to constitute the negative feedback pathway of an operational amplifier 17 whose input is a constant current 18. In practice this current could be realized by a resistor in series with a source of potential. The resulting amplifier output potential will be a direct measure of the reciprocal of the original binary digital number applied to the subtractor.

HYPERBOLA GENERATOR

When the device of FIG. 5 is to be used as a hyperbola function generator, pulses are serially applied to the register which is now operated as a simple counter, all flip-flops being connected in tandem. A time delay is necessary, as already mentioned, of $t_i=Tn_i$ seconds with respect to a starting command or synchronizing pulse. This time delay could be accomplished in several ways but I have chosen as the best mode to use a shift register 19 with a length of $n_i$ elements. Digital shift registers are well known in the art and are comprised of binary storage elements which transfer the input, upon receipt of successive clock pulses, from state to stage in a progressive sequence. Such a digital register is shown in Millman and Taub (ibid.) page 346. In the case of shift register 19, the clock signals are applied both as a continuous source of "ones" and also to provide the shifting command. The starting pulse triggers a flip-flop 20 which enables an AND gate 21 to pass clock pulses into the shift register from which pulses will emerge after a delay of $Tn_i$ seconds, where $T$ is the clock period and counts will thereafter accumulate in the register 15. As different flip-flops in the counter acquire counts, their appropriate switches will close, placing resistors in shunt with the network whose values are weighted as already discussed. A constant current operating as an input to the amplifier passes through the network with the result that the output potential of the operational amplifier will describe the trajectory or locus of a hyperbola function at a rate dictated by the clock frequency.

It should be pointed out that the use of an operational amplifier is not strictly necessary to the operation of the system. It is simply felt to be the most desirable approach to transforming a current into a proportional voltage.

This completes the description of my invention, the Digital-Analog Reciprocal Function Computer-Generator. A simple binary code was used for illustrative purposes only and clearly many other codes would serve equally well. More elaborate and complex resistor networks may conceivably be employed and other refinements which would not substantially differ in principle from what has been disclosed may now be easily by those skilled in this art without departing from the spirit and intent of these specifications.

I claim:

1. A hybrid function generator comprising:
counter means having at least a first input terminal and a plurality of output terminals, said counter means being responsive to a numerical input signal in binary form for generating an output commensurate therewith;
direct current amplifier means having an input and an output terminal;
a constant current source, said current source being connected to said amplifier means input terminal; and
a plurality of weighted circuits connected in parallel with said amplifier means, at least some of said weighted circuits including switch means, each one of said switch means being connected to a respective one of said counter means output terminals whereby said switch means will be responsive to the number loaded into said counter means and the voltage developed across said plurality of weighted circuits will be inversely proportional to the input signal.

2. The apparatus of claim 1 wherein said plurality of weighted circuits each includes a circuit element which presents a different resistance to current passing therethrough.

3. The apparatus of claim 2 wherein said counter means comprises a digital register.

4. The apparatus of claim 3 wherein said function generator is a reciprocal function generator and wherein said digital register accepts input signals in parallel or serial form.

5. The apparatus of claim 4 wherein said function generator further comprises means for subtracting a fixed number from the input signal prior to application to the counter means.

6. The apparatus of claim 3 wherein said function generator is a hyperbolic function generator and wherein said digital register accepts input signals in parallel or serial form.

7. The apparatus of claim 6 further comprising means for delaying input signals to said counter means.